(12) United States Patent
Aliabadi et al.

(10) Patent No.: US 10,097,133 B2
(45) Date of Patent: Oct. 9, 2018

(54) RACKING SYSTEM FOR INSTALLING SOLAR PANELS

(71) Applicants: Shahriar Shamloo Aliabadi, Laguna Niguel, CA (US); Michael Salvati, Santa Ana, CA (US)

(72) Inventors: Shahriar Shamloo Aliabadi, Laguna Niguel, CA (US); Michael Salvati, Santa Ana, CA (US)

( * ) Notice: Subject to any disclaimer, the term of this patent is extended or adjusted under 35 U.S.C. 154(b) by 0 days.

(21) Appl. No.: 15/487,330

(22) Filed: Apr. 13, 2017

(65) Prior Publication Data

US 2017/0302222 A1    Oct. 19, 2017

Related U.S. Application Data

(60) Provisional application No. 62/322,618, filed on Apr. 14, 2016.

(51) Int. Cl.
*H02S 20/23* (2014.01)

(52) U.S. Cl.
CPC ................... *H02S 20/23* (2014.12)

(58) Field of Classification Search
CPC ....................................................... H02S 20/23
See application file for complete search history.

(56) References Cited

U.S. PATENT DOCUMENTS

| | | | |
|---|---|---|---|
| 6,598,362 B2 | 7/2003 | Hikai | |
| 8,122,648 B1 | 2/2012 | Liu | |
| 8,153,700 B2 | 4/2012 | Stearns et al. | |
| 8,316,592 B2 | 11/2012 | Lanza | |
| 8,448,405 B2 | 5/2013 | Schaefer et al. | |
| 8,479,455 B2 | 7/2013 | Schaefer et al. | |
| 8,539,719 B2 | 9/2013 | McPheeters et al. | |
| 8,595,997 B2 * | 12/2013 | Wu | F24J 2/5205 136/244 |
| 8,683,751 B2 | 4/2014 | Stearns | |
| 8,695,290 B1 * | 4/2014 | Kim | F24J 2/5252 248/225.11 |
| 8,733,718 B2 | 5/2014 | Corsi | |
| 8,752,338 B2 | 6/2014 | Schaefer et al. | |
| 8,752,343 B2 | 6/2014 | Kuan et al. | |
| 8,756,881 B2 | 6/2014 | West et al. | |
| 8,782,983 B2 | 7/2014 | Stearns | |

(Continued)

FOREIGN PATENT DOCUMENTS

| | | |
|---|---|---|
| JP | 2008095419 A | 4/2008 |
| KR | 20140070927 A | 6/2014 |

*Primary Examiner* — Jeanette E Chapman
(74) *Attorney, Agent, or Firm* — Plager Schack LLP; Mark H. Plager

(57) ABSTRACT

A racking system is configured to install at least one photovoltaic panel on a rooftop. The racking system includes a plurality of rails. A splice bar is connected the plurality of rails and configured to mechanically strengthen the plurality of rails. A ground lug is attached to an extrusion of a side channel on each of the plurality of rails by sliding the ground lug through a rail opening. A ground wire is held in a serrated opening for safely grounding the racking system. A clamp is attached to a top channel of at least one rail such that the at least one rail and the at least one photovoltaic panel are operatively coupled to the clamp and such that the clamp is under pressure due to a spring but is able to freely rotate around a longitudinal axis.

7 Claims, 17 Drawing Sheets

(56) References Cited

U.S. PATENT DOCUMENTS

| | | | |
|---|---|---|---|
| 8,826,618 B2 | 9/2014 | Stearns | |
| 9,080,792 B2 | 7/2015 | Patton et al. | |
| 9,196,978 B2 * | 11/2015 | Magno | H01R 11/26 |
| 9,584,062 B2 * | 2/2017 | Ganshaw | H02S 20/23 |
| 2010/0276558 A1 * | 11/2010 | Faust | F24J 2/5205 |
| | | | 248/222.14 |
| 2012/0152326 A1 * | 6/2012 | West | H02S 20/23 |
| | | | 136/251 |
| 2013/0167455 A1 | 7/2013 | Jenkins et al. | |
| 2015/0107651 A1 * | 4/2015 | Cinnamon | H02S 40/36 |
| | | | 136/251 |
| 2016/0087576 A1 | 3/2016 | Johansen et al. | |
| 2016/0226434 A1 * | 8/2016 | Tomlinson | H02S 20/23 |

* cited by examiner

RACKING SYSTEM FOR INSTALLING SOLAR PANELS

RELATED APPLICATION

This application claims priority to provisional patent application U.S. Ser. No. 62/322,618 filed on Apr. 14, 2016, the entire contents of which is herein incorporated by reference.

BACKGROUND

The embodiments herein relate generally to racking system for installing solar panels (such as PV or photovoltaic panels) on roof top in various configurations.

Prior to embodiments of the disclosed invention, the racking system did not offer the flexibility in mounting the photovoltaic panels, such as mounting on different rooftops, mounting the photovoltaic panels in different orientations and mounting of the photovoltaic panels in a shared rail configuration or standard rail configuration as an all in one system. Embodiments of the disclosed invention solve this problem.

SUMMARY

A racking system is configured to install at least one photovoltaic panel on a rooftop. The racking system includes a plurality of rails. A splice bar is connected the plurality of rails and configured to mechanically strengthen the plurality of rails. A ground lug is attached to an extrusion of a side channel on each of the plurality of rails by sliding the ground lug through a rail opening. A ground wire is held in a serrated opening for safely grounding the racking system. An L-foot bracket, attached to the side channel of the plurality of rails and an inverter. A clamp is attached to a top channel of at least one rail such that the at least one rail and the at least one photovoltaic panel are operatively coupled to the clamp and such that the clamp is under pressure due to a spring but is able to freely rotate around a longitudinal axis. The clamp is modified to install the at least one photovoltaic panel at an end of the at least one rail using an end clamp and in the middle of the at least one rail for holding the at least one photovoltaic panel using a mid-clamp.

The plurality of rails can further comprise a second side channel and a slot between the side channel, the second side channel and the top channel, having a rail end covered by a rail end cap. The splice bar can be connected to the plurality of rails using a plurality of Tek screws. The ground wire can be secured by a wire bolt.

A clip bracket can be inserted into the slot between the side channel and the top channel by aligning with the mid-clamp for holding wires running through the at least one photovoltaic panel. The clip bracket can be aligned with the mid-clamp in order to securely hold at least one clip bracket on opposite sides of the plurality of rails.

The clip bracket can comprise a wire clip attached to a top exterior surface of the clip bracket. The inverter can be directly attached to the top channel of the plurality of rail. The L-foot bracket can be attached to a non-penetrating mount and then attached to the inverter.

BRIEF DESCRIPTION OF THE FIGURES

The detailed description of some embodiments of the invention is made below with reference to the accompanying figures.

DETAILED DESCRIPTION OF CERTAIN EMBODIMENTS

A racking system is configured to install at least one photovoltaic panel on a rooftop. The racking system has a plurality of rails. Each rail further comprises two side channels, a top channel and a slot between side channel and top channel. The plurality of rails are attached to each other by a splice bar and a plurality of Tek screws. A ground lug, having a ground wire secured by a wire bolt, is attached by sliding a rail opening on an extrusion of the side channel of the aluminium rail and then securing with a rail bolt for safely grounding the system. An L-foot bracket is attached to the side channel of the rail by a T-bolt for further connecting to an inverter. A clamp is attached to the top channel of the rail using the T-bolt such that the rail and each photovoltaic panel is operatively coupled to the clamp and the clamp is under pressure due to a spring but able to freely rotate. The clamp is modified to install each photovoltaic panel at the end of the rail using an end clamp and in the middle of the rail using a mid-clamp and also configured for holding more than one photovoltaic panel by using the mid-clamp.

Figure 1:
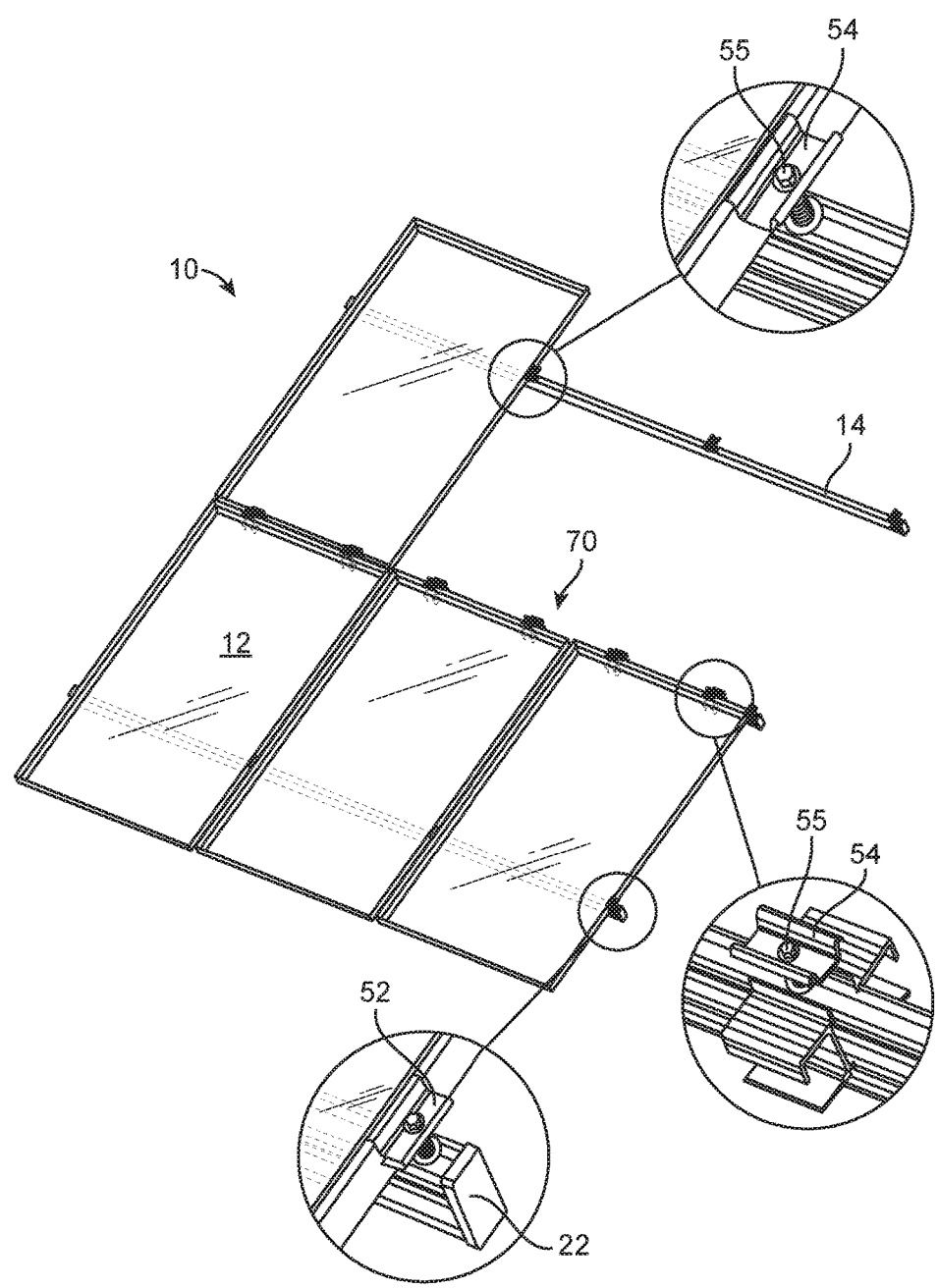
FIG. 1 shows a schematic view of one embodiment of the present invention showing a shared rail configuration.
Figure 2:
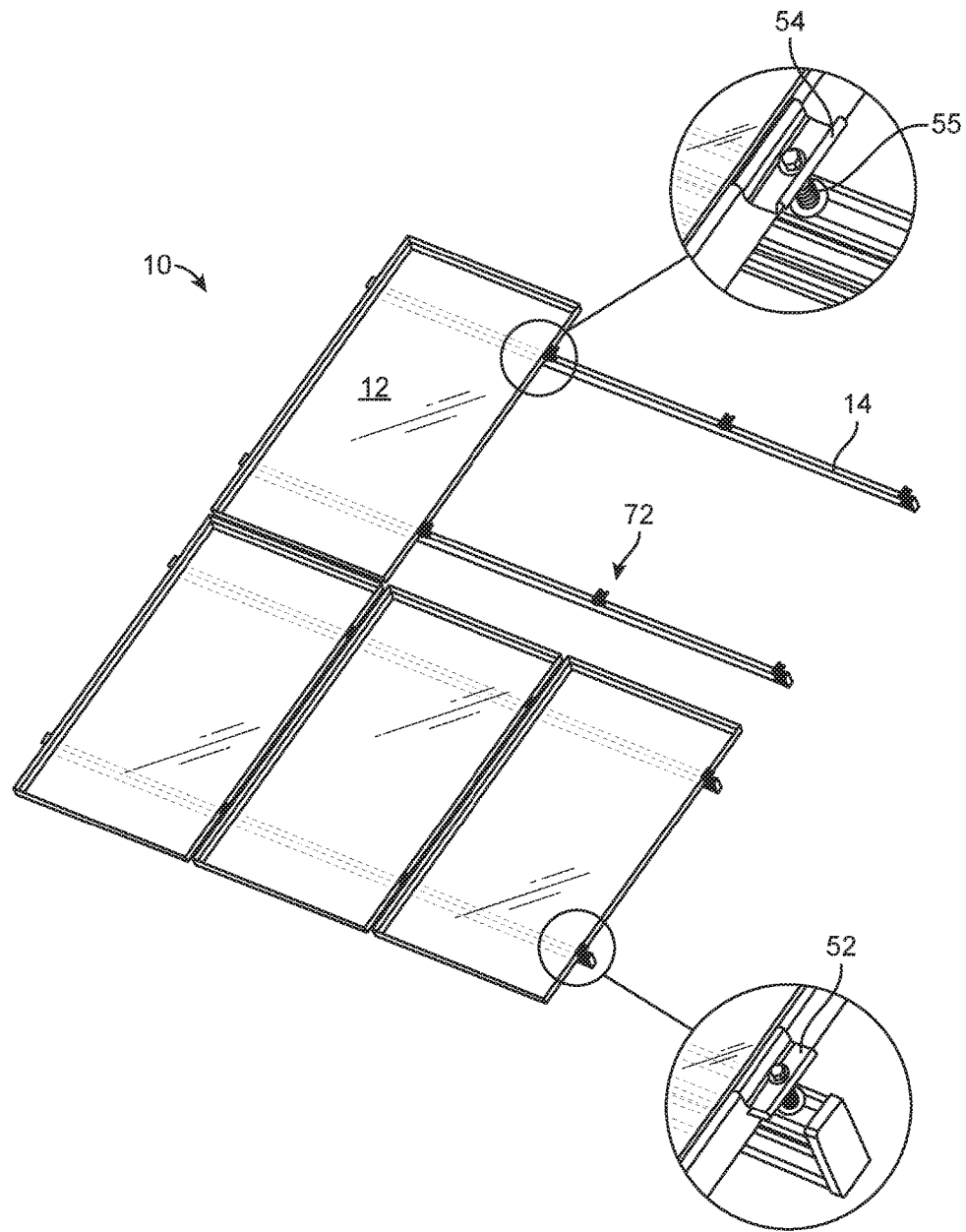
FIG. 2 shows a schematic view of one embodiment of the present invention showing a standard rail configuration.
Figure 3A:
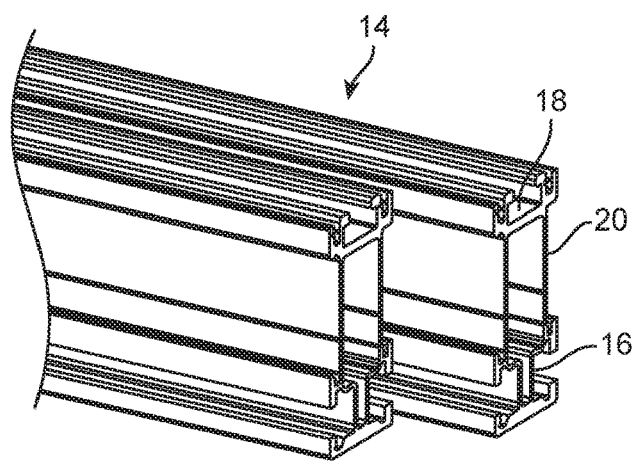
FIG. 3A shows a schematic view of an aluminium rail.
Figure 3B:
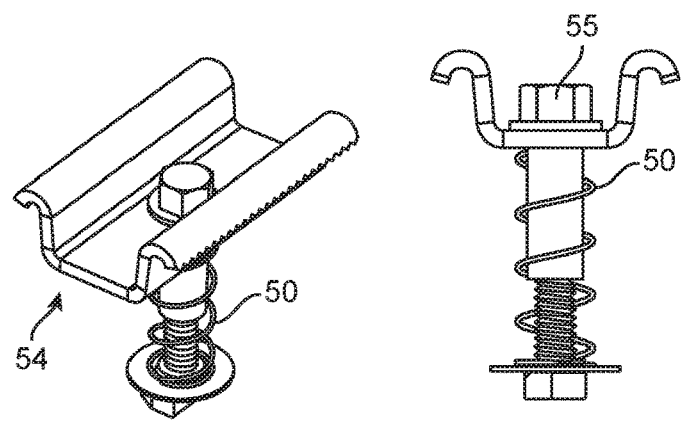
FIG. 3B shows a schematic view of a mid-clamp.
Figure 3C:
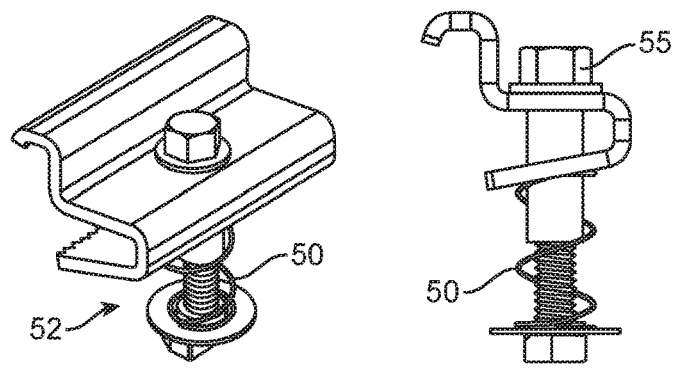
FIG. 3C shows a schematic view of an end-clamp.
Figure 3D:
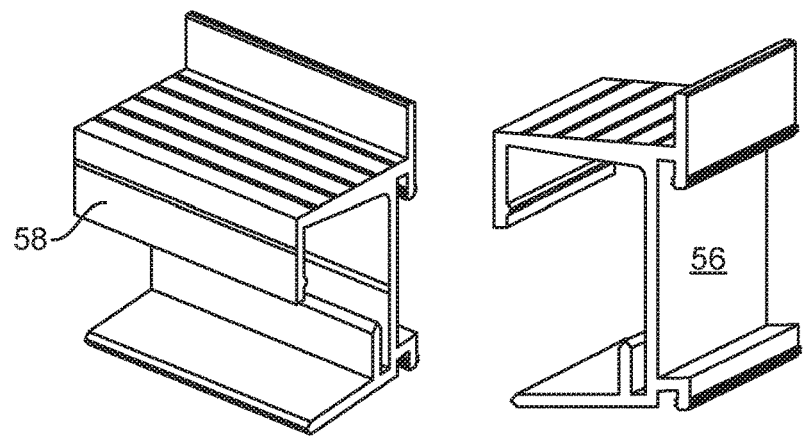
FIG. 3D shows a schematic view of a bracket.
Figure 3E:
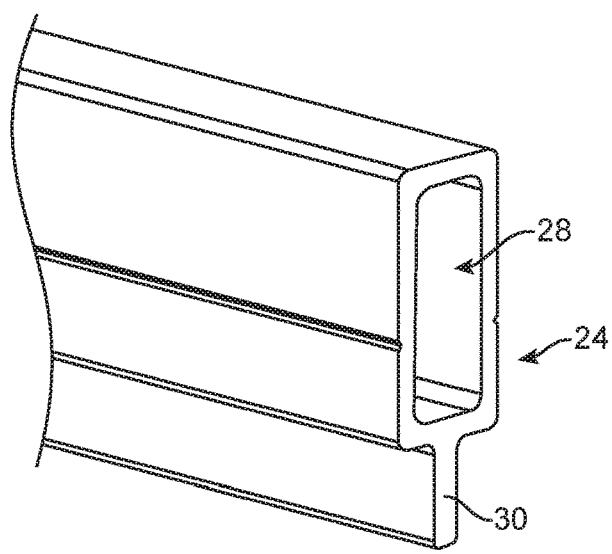
FIG. 3E shows a schematic view of a splice bar.
Figure 3F:
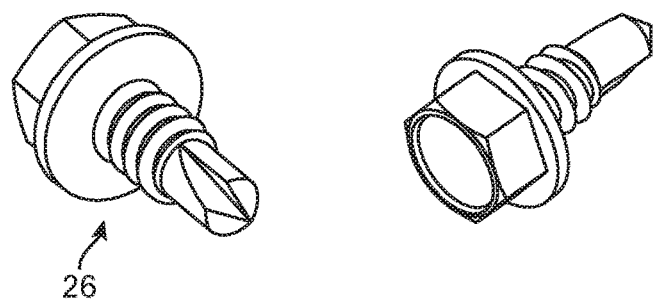
FIG. 3F shows a schematic view of a Tek screw.
Figure 3G:
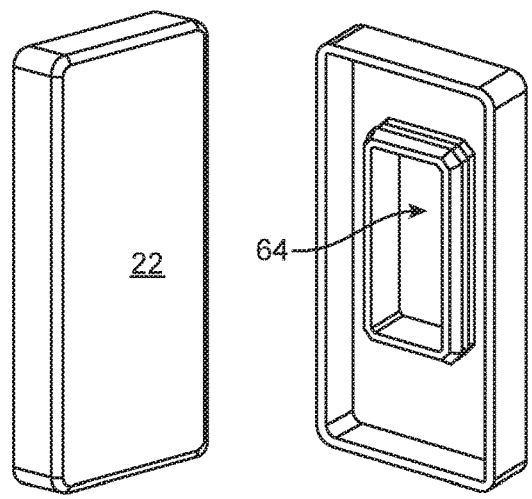
FIG. 3G shows a schematic view of a rail end cap.
Figure 3H:
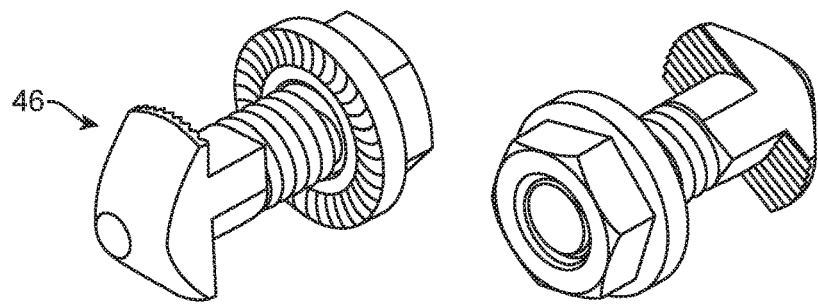
FIG. 3H shows a schematic view of a T bolt.
Figure 3I:
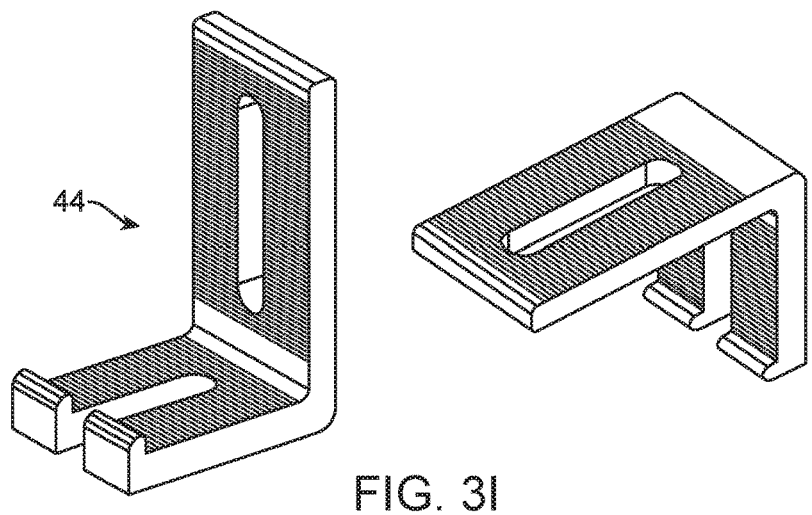
FIG. 3I shows a schematic view of an L-foot bracket.
Figure 3J:
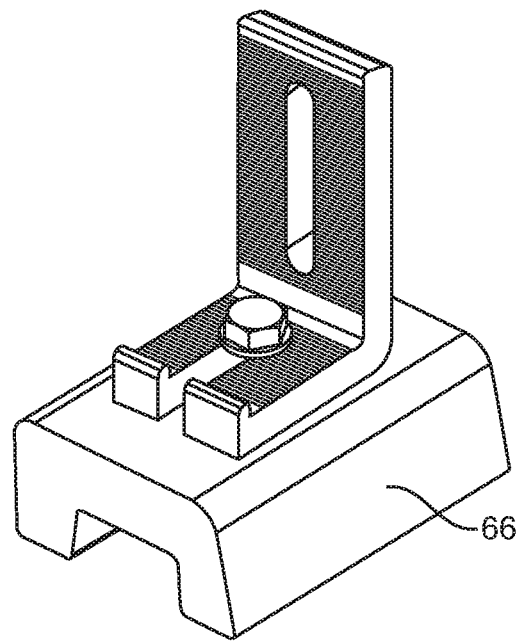
FIG. 3J shows a schematic view of an L-foot bracket mounted on a non-penetrating mount.
Figure 3K:
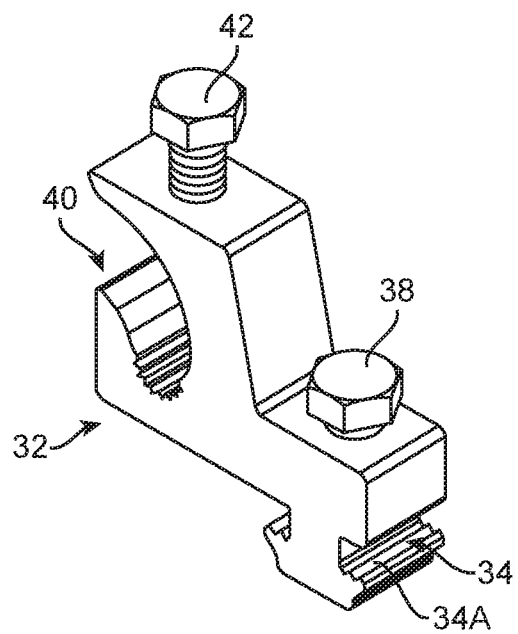
FIG. 3K shows a schematic view of a ground lug.
Figure 4:
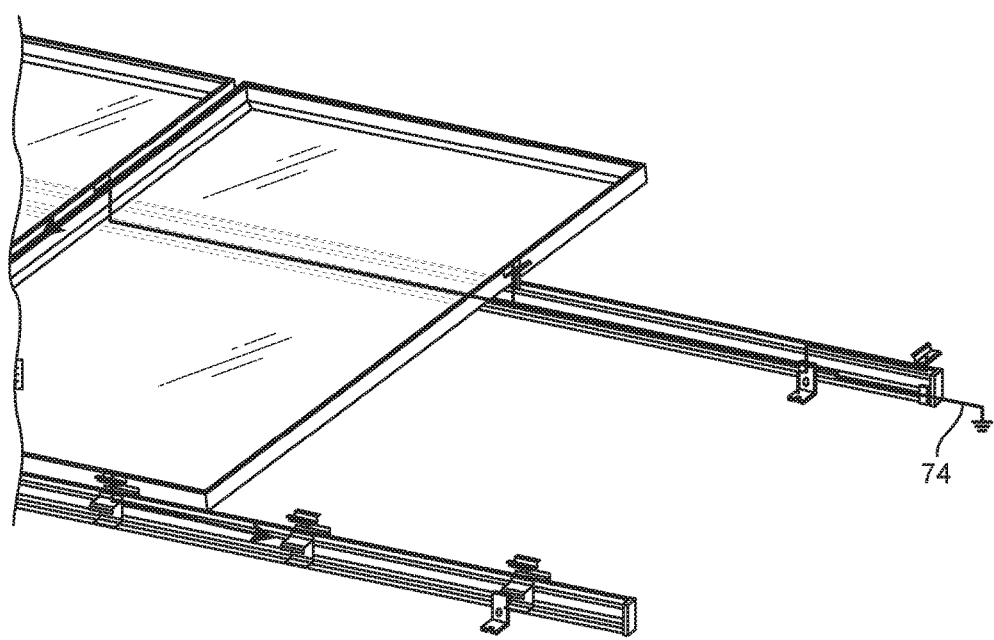
FIG. 4 shows a schematic view of grounding in the racking system.
Figure 5:
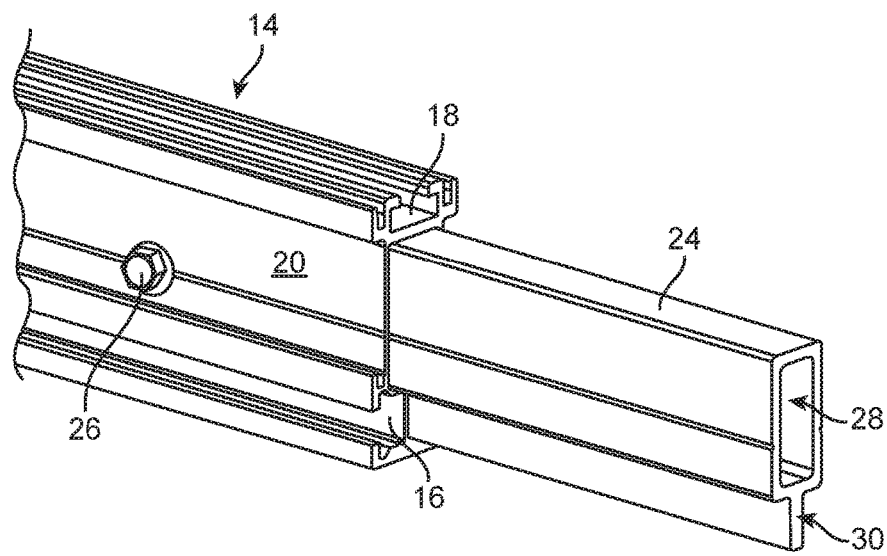
FIG. 5 shows a schematic view of a splice bar protruding from an aluminium rail.

By way of example, and referring to FIGS. 1-17, one embodiment of the present system comprises a racking system 10 that is configured to install at least one photovoltaic panel 12 on a rooftop. The racking system comprises a plurality of rails 14 having two side channels 16, a top channel 18 and a slot 20 between a side channel 16 and the top channel 18. End of the aluminum rail is covered by a rail end cap 22 press fit onto the rail 14. As shown in FIG. 5, a splice bar 24 is connected the plurality of rails to each other using a plurality of Tek screws 26 and mechanically strengthened the plurality of rails. The splice bar has a rectangular opening 28 and a narrow portion 30 for snug fit into the aluminum rail. Furthermore, a ground lug 32 is attached by sliding a rail opening 34 on an extrusion of the side channel 36 of the aluminum rail followed by securing the ground lug 32 with a rail bolt 38. The ground lug 32 holds a ground wire 74 in a serrated opening 40 that is secured by a wire bolt 42 for safely grounding the system.

An L-foot bracket 44 is attached to the side channel of the aluminum rail by a bolt 47 such that the L-foot bracket is further connected to an inverter 48. The inventor can also be directly attached to the top channel of the aluminum rail.

A clamp, such as end clamp 52 and mid-clamp 54, can be attached to the top channel of the aluminum rail using a two-part T-bolt assembly 55 such that the aluminum rail and each photovoltaic panel is operatively coupled to the clamp. The clamp is under pressure due to a spring 50 but is able to freely rotate around longitudinal axis. The clamp is modified to install each photovoltaic panel at the end of the aluminum rail using an end clamp 52 and in the middle of the aluminum rail as well as for holding more than one photovoltaic panels using a mid-clamp 54.

Figure 14:
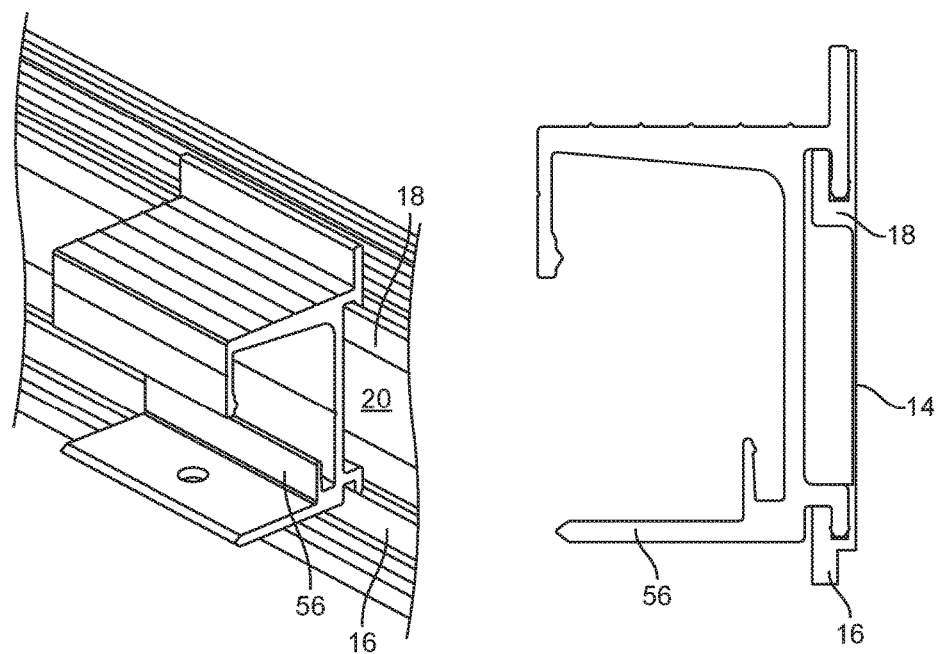
FIG. 14 shows the bracket attached to a slot between side channel and top channel.
Figure 15:
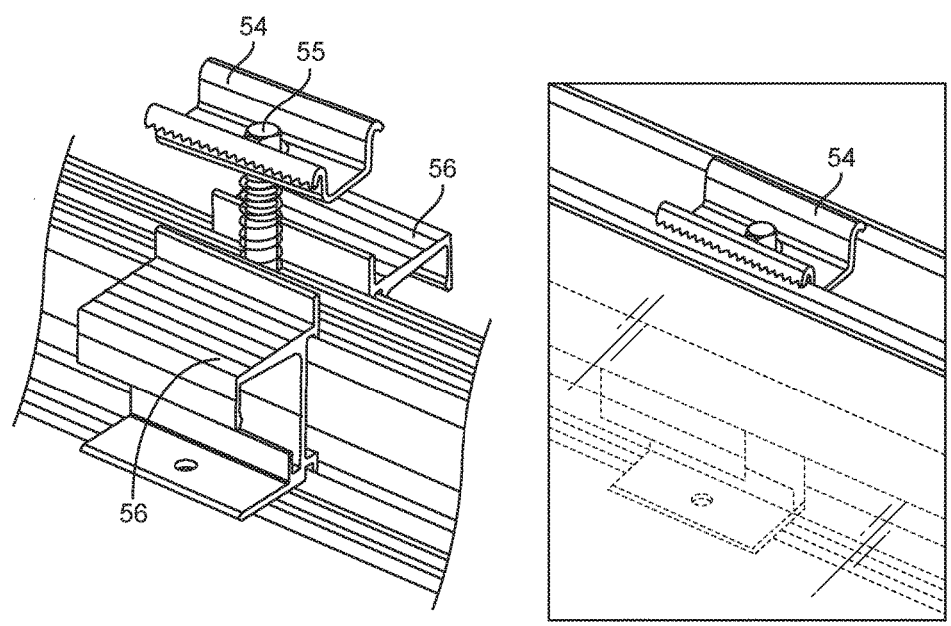
FIG. 15 shows the brackets attached on opposite sides in the slot between side channel and top channel and the mid clamp in the top channel in the aluminium rail.
Figure 16:
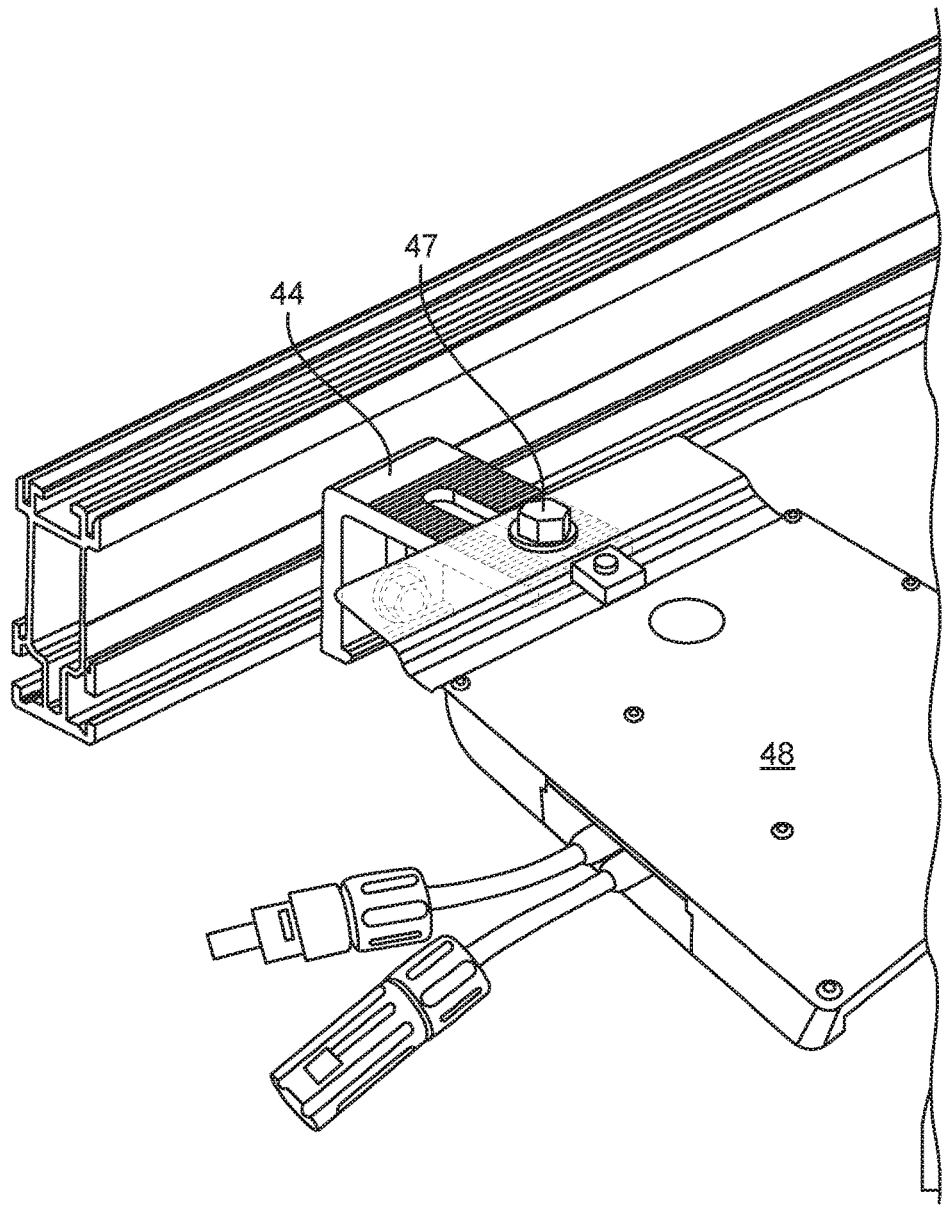
FIG. 16 shows an indirect inverter attachment to the aluminium rail via the L-foot bracket.
Figure 17:
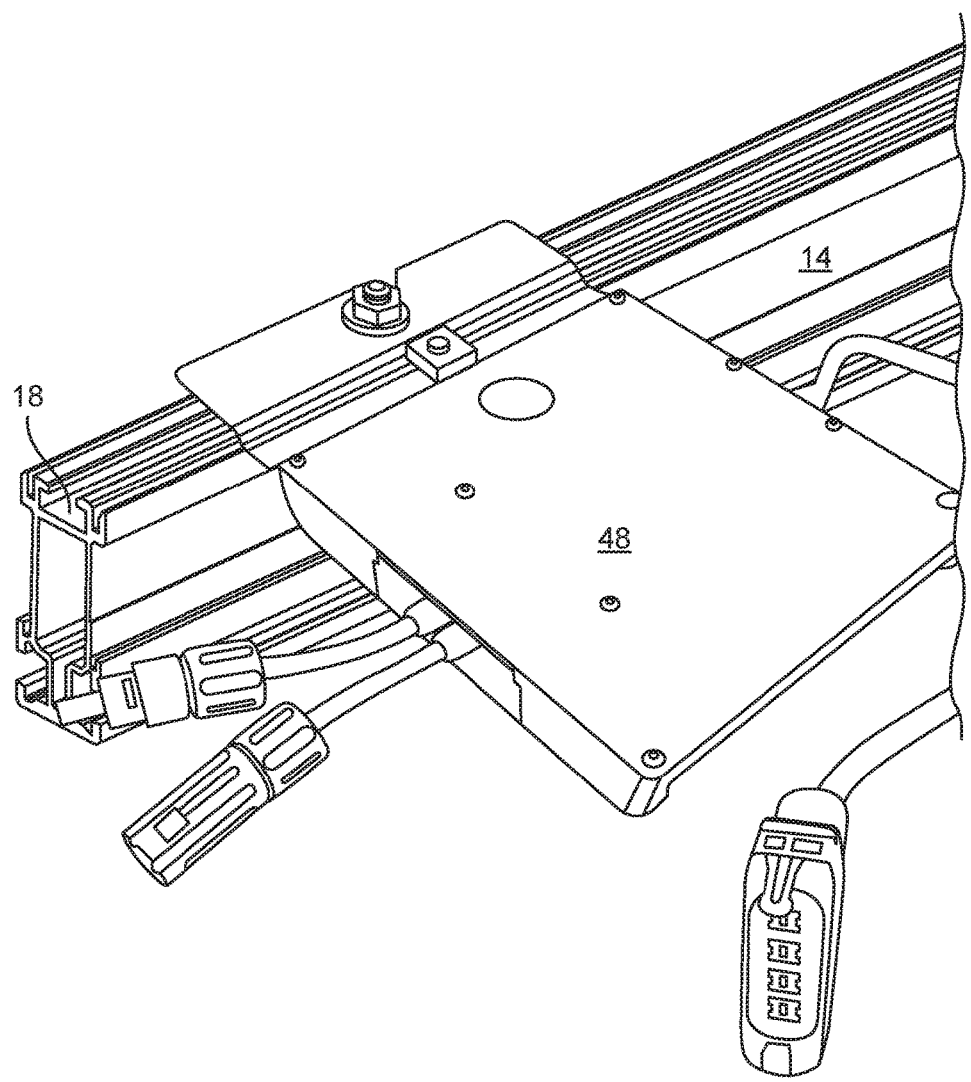
FIG. 17 shows a direct inverter attached to the aluminium rail.

FIG. 14 shows a clip bracket 56 is inserted into the slot 20 between the side channel 16 and the top channel 18 by aligning with the mid-clamp for holding wires running through the photovoltaic panel. The clip bracket further may be configured to attached a wire clip to a top exterior surface 58 of the clip bracket.

Figure 6:
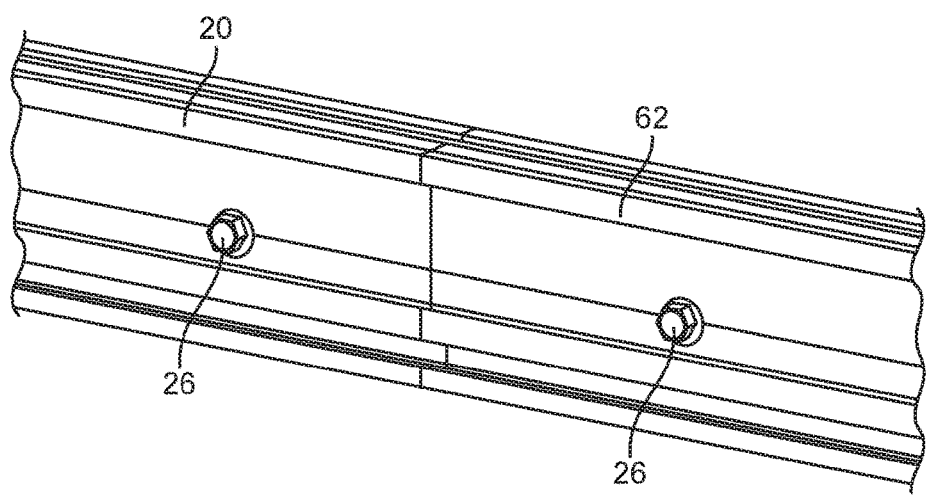
FIG. 6 shows a schematic view of the aluminum rails connected to each other.
Figure 7:
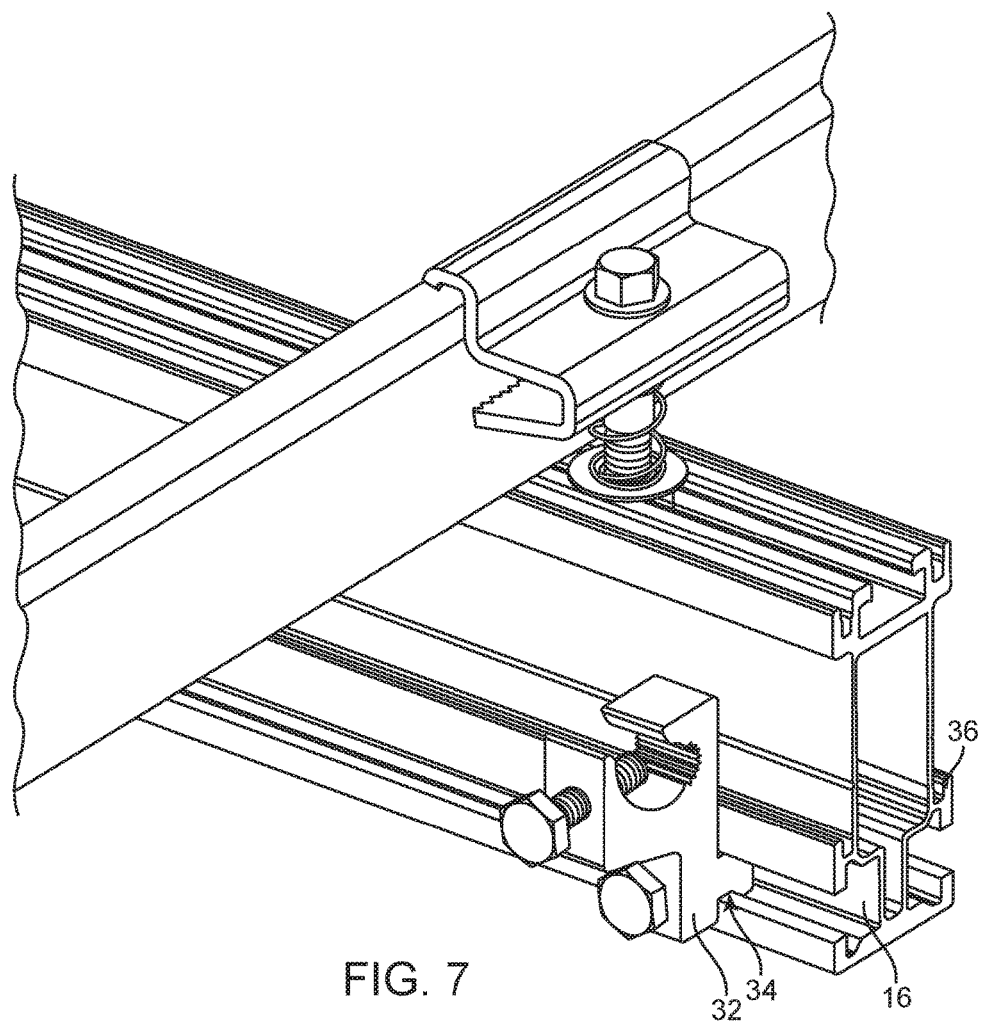
FIG. 7 shows a schematic view of the aluminium rail attached with the end clamp in a top channel and the ground lug in a side channel.
Figure 8:
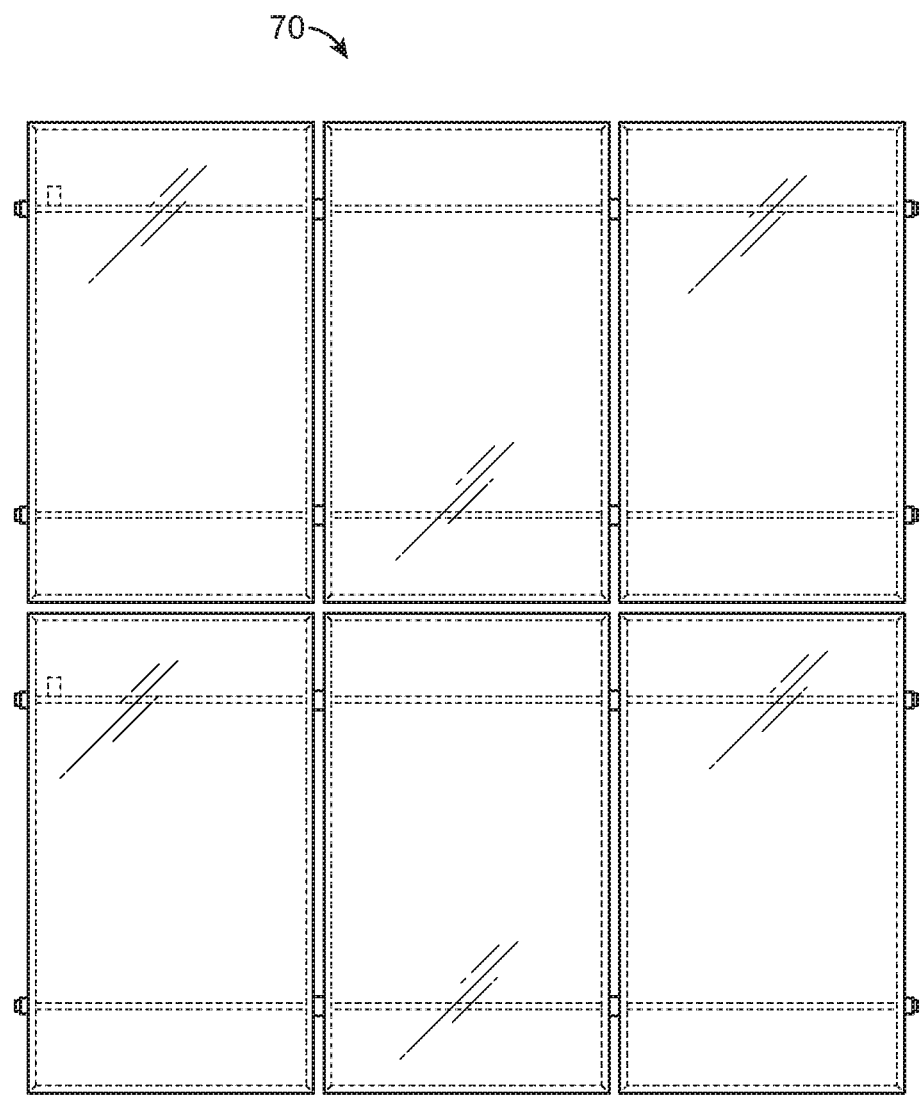
FIG. 8 shows a top view of the standard rail configuration.
Figure 9:
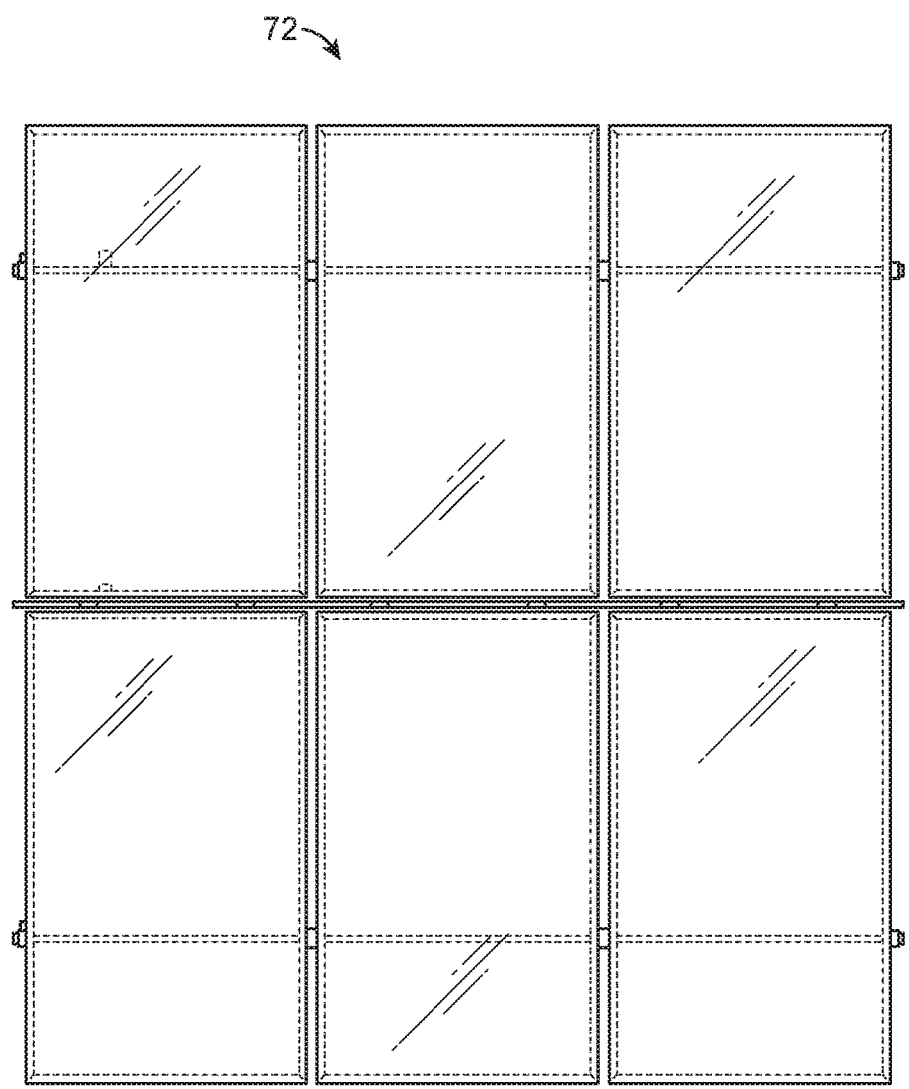
FIG. 9 shows a top view of the shared rail configuration.
Figure 10:
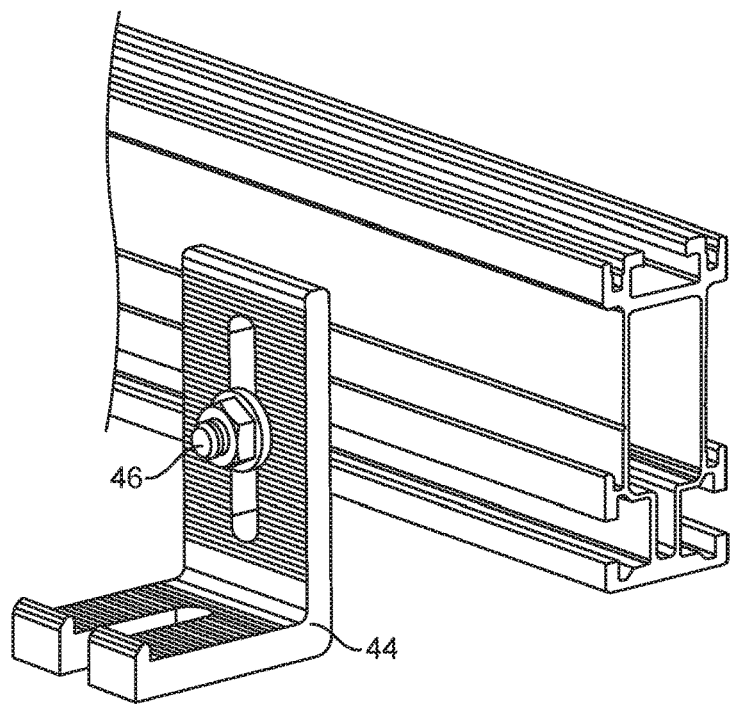
FIG. 10 shows the L-foot bracket attached to the side channel in the aluminium rail.
Figure 11:
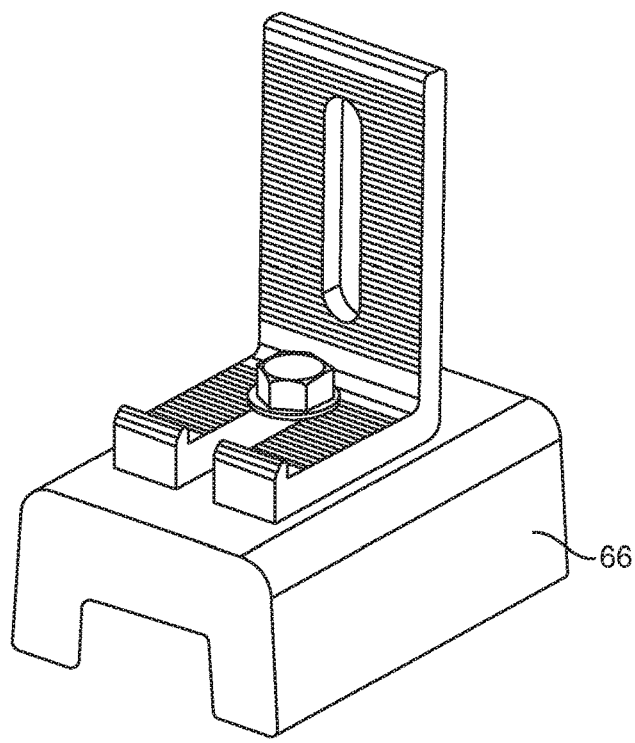
FIG. 11 shows the L-foot bracket attached to the non-penetrating mount.
Figure 12:
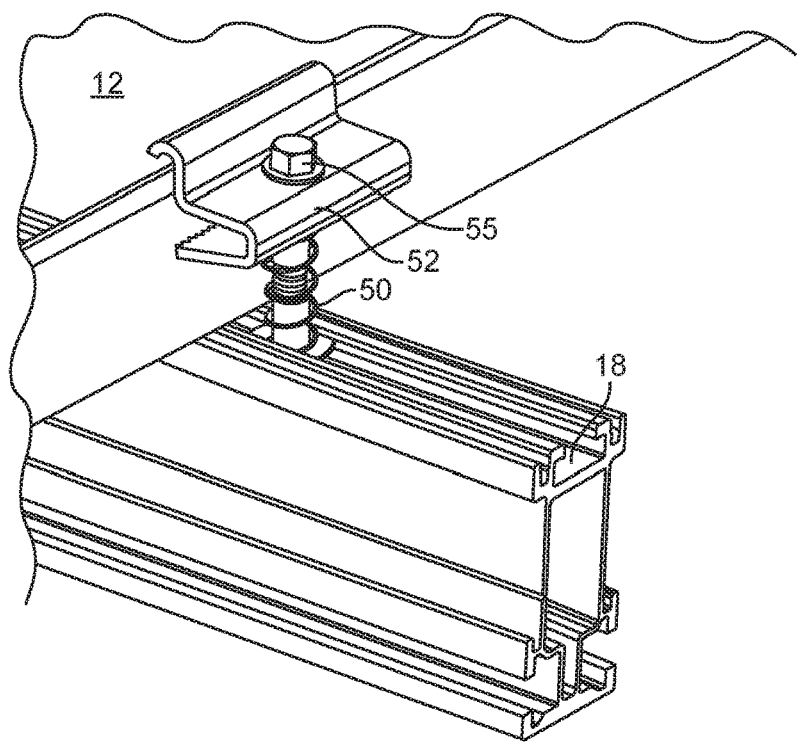
FIG. 12 shows the end clamp attached to the top channel in the aluminium rail.
Figure 13:
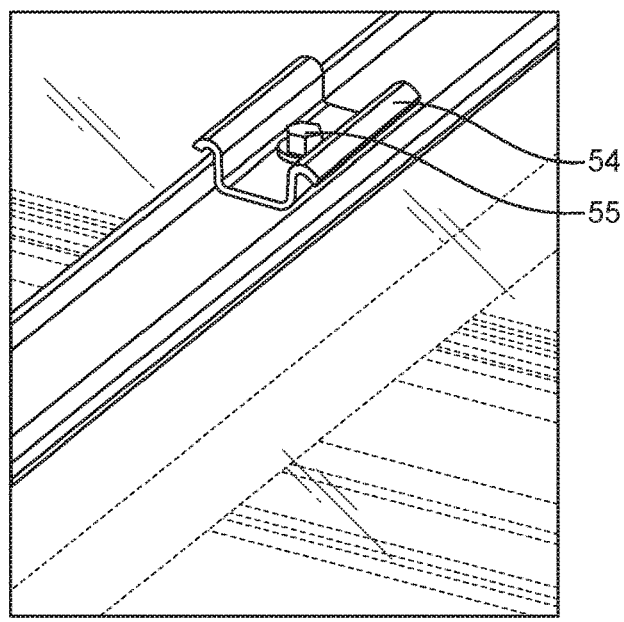
FIG. 13 shows the mid clamp attached to the top channel in the aluminum rail.

An aluminum rail can be 138 inches long and the splice bar connecting the rails can be ten inches long. FIG. 5 and FIG. 6 shown in two steps how the splice bar 24 is inserted into a first aluminum rail 20 such that half of the splice bar is exposed, then the Tek screw (such as ¼ inch screw) is screwed through the rail and the splice bar to form torque of 140 in-lb. Then a second aluminum rail 62 can be slid over exposed portion of the splice bar followed by screwing the Tek screw (such a ¼ inch screw) again to secure the rail and splice bar. The rail end caps are of plastic and server to protect ends of the rails. The rail end caps may have a cap opening 64 for fitting onto the rectangular opening of the splice bar.

Grounding of the system is achieved using the ground lug holding the ground wire, copper wire, in the serrated opening formed by the wire bolt. The ground lug is slid into the extrusion of the side channel of the aluminum rail and is fastened using the rail bolt to 35 in-lb of torque. The ground lug has sockets with ⅜" openings for the rail bolt and the wire bolt. This electrically bonds the copper wire to the ground lug.

The inverter can be attached to the aluminum rail on the side channel using the L-foot bracket and fastening by the T-bolt. The L-foot bracket is first inserted in the side channel of the aluminum rail and then fastened to the aluminum rail using the T-bolts by forming torque of 180 in-lb. through the side channel and then fastening the bolt to 180 in-lbs. A non-penetrating mount 66 with the L-foot bracket can also be used. The inverter may also be directly attached to the aluminum rail in the top channel.

Clamps are attached to the rails in the top channel for securely mounting the photovoltaic panels onto the racking system. In a standard rail configuration 72, the mid-clamp and an end clamp are used for respectively positioning the photovoltaic panel in the middle and at the end of the aluminum rail. The mid-clamp, however, can also be used in a shared configuration 70 for holding more than one photovoltaic panels. The end clamp is attached at a location that is least 1" from end of the aluminum rail. The mid-clamp and end clamps are designed for use on panel thicknesses ranging from 32 mm to 50 mm. The clamp is inserted in the top channel and fastened using the T-bolt to the top channel using ⅜" socket in the clamp. The clamp is held under pressure by the spring keeping it in place. Further, the clamp can also move freely in the rail that is useful for placing it in the correct location. Once the clamp is in place, the photovoltaic module is slid under the clamp and secured by fastening the T-bolt to 84 in-lb through a socket.

The clip bracket is slid into the slot between top channel and side channel and is aligned with location of the mid-clamp such that the mid-clamp can be used to hold the clip brackets on opposite sides of the aluminum rail using the T-bolt to product torque of 84 in-lb in ⅜" socket.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A racking system, configured to install at least one photovoltaic panel on a rooftop, the racking system comprising:
    first rail and a second rail, each rail further comprising a first extruded channel, a second extruded channel, a top channel, a first side channel, a second side channel;
    a splice bar, connected to the first rail and the second rail and configured to mechanically strengthen each rail; the splice bar further comprising a central rectangular tube joined to a centrally located narrow portion;
    a ground lug, further comprising:
        a rail attachment portion having a rail attachment serrated portion that slides into the first extruded channel;
        a rail bolt, joining the rail attachment portion into the first extruded channel;
        a serrated opening; above the rail attachment portion; wherein a ground wire is electrically bonded to the serrated opening with a wire bolt;
    an L-foot bracket, attached to the first side channel and an inverter;
    a clamp, attached to the top channel of the first rail such that the first rail and the at least one photovoltaic panel are operatively coupled to the clamp.

2. The racking system of claim 1, wherein first rail further comprises a rail end covered by a rail end cap.

3. The racking system of claim 2, wherein the splice bar is connected to the first rail and the second rail using a plurality of Tek screws.

4. The racking system of claim 1 further comprising a clip bracket, inserted into the slot between the side channel and the top channel by aligning with the mid-clamp for holding wires running through the at least one photovoltaic panel, wherein the clip bracket is aligned with the mid-clamp in order to securely hold at least one clip bracket on opposite sides of the first rail and the second rail.

5. The racking system of claim 4, wherein the clip bracket comprised a wire clip attached to a top exterior surface of the clip bracket.

6. The racking system of claim 5, wherein the inverter is directly attached to the top channel of the first rail.

7. The racking system of claim 6, wherein the L-foot bracket is attached to a non-penetrating mount and then attached to the inverter.

* * * * *